(12) United States Patent
Mancosky

(10) Patent No.: US 11,326,137 B2
(45) Date of Patent: May 10, 2022

(54) METHOD OF INFUSING BEER WITH HOPS FLAVORING USING CONTROLLED MECHANICALLY INDUCED CAVITATION

(71) Applicant: HYDRO DYNAMICS, INC., Rome, GA (US)

(72) Inventor: Douglas G. Mancosky, White, GA (US)

(73) Assignee: Hydro Dynamics, Inc., Rome, GA (US)

( * ) Notice: Subject to any disclaimer, the term of this patent is extended or adjusted under 35 U.S.C. 154(b) by 560 days.

(21) Appl. No.: 15/966,880

(22) Filed: Apr. 30, 2018

(65) Prior Publication Data

US 2018/0320118 A1 Nov. 8, 2018

Related U.S. Application Data

(63) Continuation of application No. 15/085,616, filed on Mar. 30, 2016, now abandoned.

(Continued)

(51) Int. Cl.
*C12H 1/16* (2006.01)
*C12C 5/02* (2006.01)
(Continued)

(52) U.S. Cl.
CPC ......... *C12H 1/165* (2013.01); *B01F 27/2722* (2022.01); *C12C 5/026* (2013.01); *C12G 3/07* (2019.02); *C12H 1/16* (2013.01)

(58) Field of Classification Search
CPC .. C12H 1/16; C12H 1/165; C12G 1/00; C12C 5/026
(Continued)

(56) References Cited

U.S. PATENT DOCUMENTS

| 4,173,656 A | 11/1979 | Duggins |
| 4,210,676 A | 7/1980 | Wilhelm et al. |

(Continued)

FOREIGN PATENT DOCUMENTS

| CA | 2 981 287 | 10/2016 |
| CN | 202 346 996 | 7/2012 |

(Continued)

OTHER PUBLICATIONS

Million, Donald, Dry Hopping Techniques, Sep. 2003 pp. 1-3 https://byo.com/article/dry-hopping-techniques/ (Year: 2003).*

(Continued)

*Primary Examiner* — Vera Stulii
(74) *Attorney, Agent, or Firm* — Womble Bond Dickinson (US) LLP

(57) ABSTRACT

An extreme acceleration of the process of aging spirits to obtain aged liquors includes circulating the spirits through a cavitation zone within a controlled cavitation reactor and exposing the spirits therein to high energy cavitation induced shockwaves. Sources of flavor and color such as charred wood chips may be added to the spirits to provide the color and flavor of liquors aged for years in traditional charred oak barrels. The method and apparatus of the present invention obtains the same conversion of undesirable alcohols, flavor extraction, and color as years of aging in an oak barrel but does so in a matter of minutes or hours. The apparatus and method also can be used in conjunction with traditional aging techniques and methods and the total aging time is still reduced dramatically.

9 Claims, 2 Drawing Sheets

Related U.S. Application Data

(60) Provisional application No. 62/141,595, filed on Apr. 1, 2015, provisional application No. 62/293,069, filed on Feb. 9, 2016.

(51) Int. Cl.
*C12G 3/07* (2006.01)
*B01F 27/272* (2022.01)

(58) Field of Classification Search
USPC .............. 426/425, 590, 238, 262, 310, 654
See application file for complete search history.

(56) References Cited

U.S. PATENT DOCUMENTS

| | | |
|---|---|---|
| 5,183,513 A | 2/1993 | Sajewski |
| 5,184,576 A | 2/1993 | Sajewski |
| 5,188,090 A | 2/1993 | Griggs |
| 5,239,948 A | 8/1993 | Sajewski |
| 5,385,298 A | 1/1995 | Griggs |
| 5,957,122 A | 9/1999 | Griggs |
| 6,627,784 B2 | 9/2003 | Hudson et al. |
| 7,360,755 B2 | 4/2008 | Hudson et al. |
| 7,507,014 B1 | 3/2009 | League et al. |
| 8,430,968 B2 | 4/2013 | Mancosky et al. |
| 8,465,642 B2 | 6/2013 | Kazem |
| 2006/0210679 A1 | 9/2006 | Leonhardt et al. |
| 2010/0104705 A1 | 4/2010 | Roman et al. |
| 2012/0204728 A1 | 8/2012 | Roleder et al. |
| 2014/0220179 A1* | 8/2014 | Matsui .................. A23L 2/54 426/11 |
| 2014/0287110 A1 | 9/2014 | Benjamin et al. |

FOREIGN PATENT DOCUMENTS

| | | |
|---|---|---|
| EP | 3277789 A1 | 2/2018 |
| GB | 1 083 835 | 9/1967 |
| GB | 2 181 403 | 4/1987 |

OTHER PUBLICATIONS

International Search Report and Written Opinion for International Application No. PCT/US2016/025583 dated Jul. 18, 2016.

* cited by examiner

METHOD OF INFUSING BEER WITH HOPS FLAVORING USING CONTROLLED MECHANICALLY INDUCED CAVITATION

REFERENCE TO RELATED APPLICATION

This is a continuation of pending U.S. patent application Ser. No. 15/966,843 filed on Apr. 30, 2018, which is a continuation of patent application Ser. No. 15/085,616 filed on Mar. 30, 2016, which claims priority to the filing date of U.S. provisional patent application 62/141,595 filed on Apr. 1, 2015 and to the filing date of U.S. provisional patent application 62/293,069 filed on Feb. 9, 2016. The contents of these patent applications are hereby incorporated by reference.

TECHNICAL FIELD

This disclosure relates generally to the aging of alcoholic beverages such as distilled spirits, beer, and wine, and more specifically to the rapid aging of alcoholic beverages using controlled mechanically induced cavitation to enhance maturity and drinkability of resulting beverages thereby simulating traditional aging.

BACKGROUND

The most desired of spirits are aged. Examples include whisky, scotch, bourbon, tequila, and many others. Likewise, beer and wine also are aged prior to drinking. These aged products are more expensive by virtue of the time and resources expended during the aging process and arguably have more enjoyable flavors and aromas than alcoholic beverages that are non-aged. The aging process softens the 'burn' of the ethanol while smoothing out flavors and adding even more pleasant ones. Further, undesirable and even poisonous alcohols and other products are largely converted to more desirable and less offensive tasting esters during aging.

Traditionally, newly distilled spirits are aged in a variety of ways, with perhaps the most common being barrel aging. Newly distilled or "white" whisky, for example, is commonly aged in Southern white oak barrels that have been burnt or charred on the inside. Aging exposes the alcohol and other compounds both to oxygen in the air and the storage materials themselves (charred oak for instance) for long periods of time, usually many years or even decades. This alters the chemical structure of many of the alcoholic compounds and changes the color, aroma, and flavor of the resulting liquor in various and mostly beneficial ways. Beer and wine also are aged in aging vessels for similar reasons.

Alcoholic beverages are created through fermentation of a biological product, be it grapes, grain mash, fruit, plants, or another product. In the case of distilled spirits, distillation yields primarily ethanol, but also produces aldehydes, esters, and fatty acids, all of which have very specific flavors and aromas. It is at least in part the unique combination of these chemicals that make spirits different from one another. Multiple distillations and filtering can remove many of these compounds to create a "clean" or aromaless and flavorless spirit such as Vodka. The choice of raw materials, the fermentation process, and the distillation technique and equipment will all contribute to the overall chemical composition and therefore the aroma and taste of the final product.

Distilling alcohol creates beneficial byproducts, as mentioned above, but also creates bad-tasting and poisonous byproducts, including butane, methanol, hydrazines, acetates, and acetaldehydes. Both good and bad byproducts often are grouped together under the label "congeners." Fortunately, the good congeners happen to be quite stable, whereas the bad ones break down or are converted to more desirable compounds or at least to inert compounds over time. Aging a distilled product allows this time to pass, thereby decreasing the amount of bad tastes and poisons and increasing the amount of good flavor and aroma. Research has shown that basically all the effects of aging occur within fifteen years with virtually no perceptible change in aroma and flavor occurring thereafter. This is part of the reason why, for instance, most scotch is aged for between 12 and 15 years.

There have been attempts over the years to obtain the beneficial chemical changes in distilled spirits caused by aging without having to wait for years for them to occur. Some distillers, for example, prefer to age spirits in small barrels, which increases the relative area of contact between the spirits and the inside of the barrel. This has not been completely successful however and still can require several years to obtain desired benefits. More recently, so-called artificially accelerated aging has become known and has been tried. In one such process, a distilled spirit is pumped through an oxygenated chamber, where it is subjected to high-intensity ultrasonic energy or sound waves. The agitation caused by the sound waves induces esterification. It has been shown that this process can at least to some extent artificially replicate the aging process of liquor such as whisky by inducing more harsh "higher" alcohols like isopropanol to react with fatty acids to produce esters with more pleasant flavors. This is often referred to "oxidation" in the industry. While it is claimed that ultrasound aging can reduce the production of aged liquors from years to hours, the result has not been completely satisfactory at least in part because it has proven very challenging to scale up ultrasound processes to commercial production volumes.

A need exists for a method and apparatus that can obtain the same beneficial chemical reactions and infusion of flavors in alcoholic beverages such as distilled spirits, beer, and wine caused by traditional aging, but obtains them in hours rather than years. The method should be able to age alcoholic beverages in a continuous process and in commercial volumes. It is to the provision of such a method and an apparatus for carrying out the method that the present invention is primarily directed.

SUMMARY

Briefly described, a method and apparatus is disclosed for aging an alcoholic beverage such as distilled spirits, beer, or wine (which may collectively be referred to herein as "spirits") in hours rather than years. The process can be used to age spirits in commercial volumes and in such a way that the final product is virtually indistinguishable from spirits aged for years in barrels or other aging vessels. The method includes passing liquid spirits through a treatment zone and inducing in the liquid highly energetic cavitation events. Preferably, the liquid is passed through a controlled cavitation reactor such as that disclosed in U.S. Pat. Nos. 8,465,642; 8,430,968; 7,507,014; 7,360,755; and 6,627,784, each of which is hereby incorporated by reference in its entirety. The reactor has a closed cylindrical housing within which a cylindrical rotor is rotatably mounted. The treatment zone is defined between the outer surface of the rotor and the inner surface of the housing. Bores are formed through the outer surface of the rotor and when the rotor is rotated at a high rate with spirits in the treatment zone, very energetic cavitation events are generated within the bores.

The cavitation events within the bores in turn generate micro shock waves that propagate through the spirits in the treatment zone. The shock waves, which are very highly energetic, break down undesirable alcohols, tannins, and other chemicals in the spirits just as traditional aging does, thus mellowing the taste of the spirits. In one exemplary embodiment, charred wood chips are mixed with distilled spirits and the cavitation events draw out the flavors from the wood chips and infuse them in the distilled spirits. The result is liquor comparable in color, aroma, and taste to that obtained from years of aging in a barrel, but requiring minutes or hours rather than years to obtain. In another embodiment, hops are added to beer and the shock waves draw out the flavor of the hops and infuse the flavor in the beer more efficiently than traditional aging.

With the proliferation of craft breweries and their more heavily hopped beers, the demand for hops and their prices have increased. Typically only about one third of the flavor potential is extracted from hops during traditional beer aging. Hops can be added for bittering purposes prior to fermentation or for flavor purposes post fermentation, often called dry hopping. Using the pressure fluctuations of shock waves from cavitation, hop flavor can be extracted and infused into beer much more efficiently in a very short time. This is accomplished in a relatively low shear environment to minimize protein damage to the hops and to minimize fines production. The ultimate result is a reduction in hops usage to produce a desired hops flavor in beer as well as higher yields due to more efficient flavor extraction and less beer soaked hop waste. Other flavorings such as coffee or chocolate also can be added.

Red "young wines" often have a strong tannin taste. Reduction of tannins commonly requires aging of wine in barrels or stainless steel aging vessels for many years. This reduces the tannins and leads to improved taste and thus increased value. This tannin reduction is a chemical reaction and it has been found that this chemical reaction can be sped up greatly by passing young wine through a controlled cavitation reactor according to the present invention. Accordingly, the present invention can be applied to wine, with or without added flavorings, to reduce or eliminate the traditional aging process.

These and other aspects, features, and advantages of the present invention will be better appreciated upon review of the detailed description set forth below taken in conjunction with the accompanying drawing figures, which are briefly described as follows.

DETAILED DESCRIPTION

Figure 1:
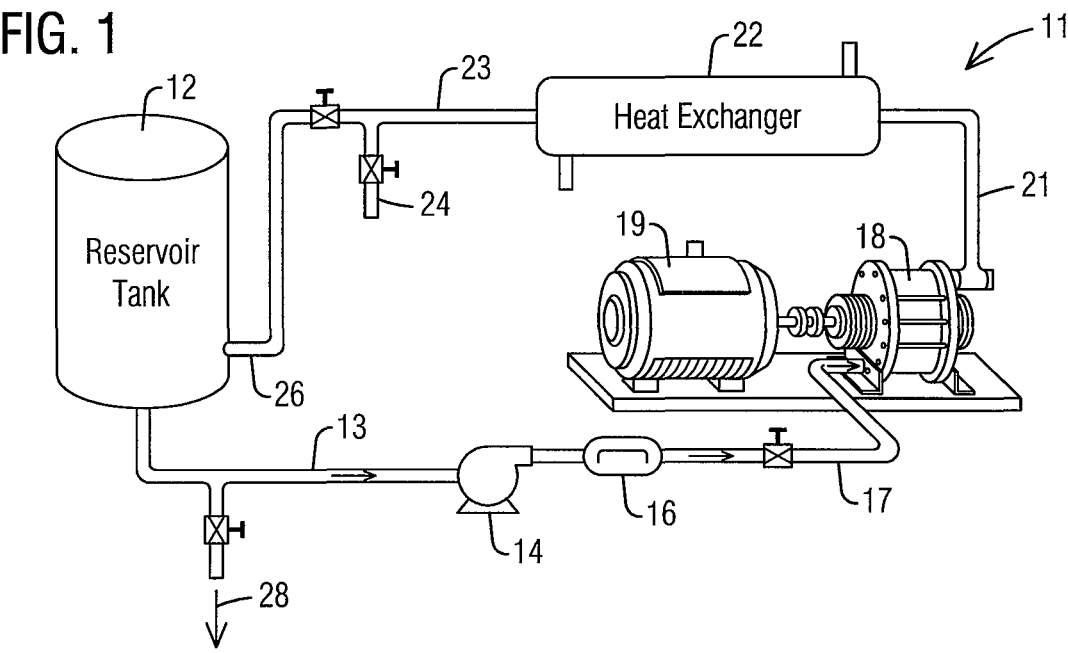
FIG. 1 is a schematic view showing one embodiment of an apparatus for carrying out the method of the present invention.

The invention will now be described in more detail and this description should be reviewed in conjunction with the accompanying drawing figures for enhanced clarity.

Mechanically induced and controlled cavitation such as that produced by the controlled cavitation devices disclosed in the incorporated references, is used according to the present invention to obtain artificial aging of alcoholic beverages such as distilled spirits on a high volume commercial scale. In one embodiment, the system includes a reservoir tank for holding an alcoholic beverage during the aging process. A pump circulates the beverage from the reservoir tank, through the controlled cavitation device, and back to the reservoir tank. In this way, the alcoholic beverage being aged can be circulated through the controlled cavitation device for as many cycles as necessary to obtain the desired degree of aging and flavoring.

In another embodiment, charred wood chips are added to distilled spirits and become entrained in the flow through the controlled cavitation device. The intense cavitation to which the spirits and wood chips are subjected in the cavitation device penetrate the wood chips and extracts color and flavor from them, which is infused into the liquid. This process also drives the liquid spirits into and out of the pores of the chips, which helps filter some undesirable compounds from the mix in much the same way that the charred interior of an oak barrel does over years of traditional aging. In other embodiments, hops and/or other flavors may be added to the alcoholic beverage for the aging of beers for example. Other flavoring and/or aroma sources such as fruits, oils, chocolates, flowers, spices, and other substances may be added for the production of a variety of products from flavored liquors to beer to wine and even to perfumes.

When used to age distilled spirits, the system of this invention can run for varying periods of time to obtain numerous cycles of a mixture through the controlled cavitation device. Varying amounts of char and various species of wood chips and/or flavoring may be selected to obtain a desired flavor, color, and filtration effect. It has been found that the time required for aging can range from a few minutes to many hours depending upon the composition of the original distilled spirit, the amount of desired color and flavor desired, and the number of years of traditional aging being matched. A heat exchanger may also be incorporated in the loop for longer runs to dissipate heat build-up caused by the cavitation device and any exothermic reactions occurring in the mix.

Internal clearances within the controlled cavitation device such as the space between the rotor and interior walls of the housing may be adjusted to accommodate different size charred wood chips. This is advantageous since wood chip surface area is an independent variable in the resultant aging process. Wood chips may also be substituted with a replaceable wooden ring insert that is internally concentric to the controlled cavitation device housing. Such a ring can be charred prior to an aging process to obtain the same desirable characteristics as the charred interior walls of a traditional oak barrel. In either event, the spirits are forced into and out of the pores of the charred wood chips or charred ring by the high intensity shock wave induced pressure variations, thereby releasing color and flavor into the mix. The intense pressure fluctuation also functions to remove sulfur species and other contaminants from distilled spirits through a filtration process akin to charcoal filtration. More specifically, the spirits are forced by the pressure variations into and out of the pores and particles of the charred wood, which filters the spirits in much the same way as an activated charcoal filter bed. Advantageously, the flavoring, coloring, and filtering process are accelerated by orders of magnitude over traditional barrel aging processes.

As mentioned above, ultrasound has been used in the past to obtain somewhat accelerated aging of spirits. The system of the present invention has many advantages over ultrasound treatment. For instance, ultrasound aging systems can work acceptably well on a small or laboratory scale, but such systems are difficult to scale up and replicate laboratory results in commercial volumes. The use of controlled cavitation in the present invention provides similar or near identical results at nearly any commercial volume. Cavitation events in the controlled cavitation device typically produce intense shock waves in a liquid being treated that expose the molecules in the liquid to far higher energies than are possible with ultrasound. This can result in more rapid flavor intensification and more rapid conversion of undesirable alcohols in the mixture into esters and other less objectionable compounds.

Gasses such as oxygen also may be added to the mix to accelerate the oxidation and conversion of undesirable alcohols and other chemicals. Also, ultrasound liquor aging devices rely on small clearances and mechanical shear to enhance the effects of the ultrasound aging process. These requirements are not conducive to particulates like wood chips being added to the liquor mix. A controlled cavitation device of the present invention can easily accommodate wood chips and other solids because of its inherent low shear and relatively large internal clearances.

The same principles used to extract flavor and color from charred wood chips in liquor aging can be used to extract sugars, starches, oils, and other substances from woods and other lignocellulosic material in applications such as ethanol and biogas production. Substances such as waste food or algae can experience component extraction in a similar way. In such processes, the intense pressure fluctuations caused by the cavitation induced shock waves force a solvent into a solid to remove entrapped components such as sugars and starches. These intense high energy shock waves are also capable of causing lysis of pressurized bodies like cells. Examples of this include treatment of algae or bacteria with the cavitation induced lysis allowing for oil and carbohydrate extraction or pasteurization. Cavitation can also reverse hornification where the pore structure of a lignocellulosic material dries and bonds to itself limiting future use of its natural capillary system. The pressure fluctuations can force solvent into this structure and reopen it to near its original condition prior to drying.

FIG. 1 illustrates in simplified schematic form a controlled cavitation reactor suitable for use in carrying out the methodology of the present invention. Such a reactor is described in detail in the incorporated references, and so will be describe only generally here. The reactor 11 comprises a reservoir tank 12 for holding a liquid alcoholic beverage during the aging process. Liquid is drawn from the reservoir tank 12 through conduit 13 by a pump 14 and delivered through a flow meter 16 and conduit 17 to a controlled cavitation reactor 18. The controlled cavitation reactor 18 generally comprises a cylindrical housing having an internally mounted cylindrical rotor. A space is defined between the outer peripheral surface of the rotor and the inner peripheral surface of the housing and this space is referred to as the cavitation zone. Cavitation-inducing structures such as radial bores are formed in or one the outer peripheral surface of the rotor. The rotor is rotated within the housing by an electric motor 19.

The liquid is pumped through the cavitation reactor within which it flows through the cavitation zone. As the rotor is rotated at a high rate, continuous cavitation events are induced in the liquid within the radial bores. This, in turn, produces highly energetic shock waves caused by continuously collapsing cavitation bubbles to propagate through the liquid in the cavitation zone. These shock waves induce the reactions described above within the alcoholic beverage, thereby duplicating traditional aging processes, but doing so in minutes rather than years. Charred wood chips may be mixed with the liquid, particularly when aging distilled spirits, to infuse the white spirits with color and flavor similar to that resulting from years of aging in charred barrels. After treatment in the reactor 18, the liquid flows through conduit 21 and may flow through a heat exchanger 22 to remove unwanted heat induced by the energy of cavitation. The cooled liquid then flows through conduit 23 and inlet 26 back to the reservoir tank 12. The liquid and entrained chips and/or other flavorings if desired may be circulated through the cavitation reactor as many times as desired to obtain a desired level of aging, flavor, and aroma. Then, it can be extracted as an aged and flavored alcoholic beverage, as indicated by arrow 28.

Figure 2:
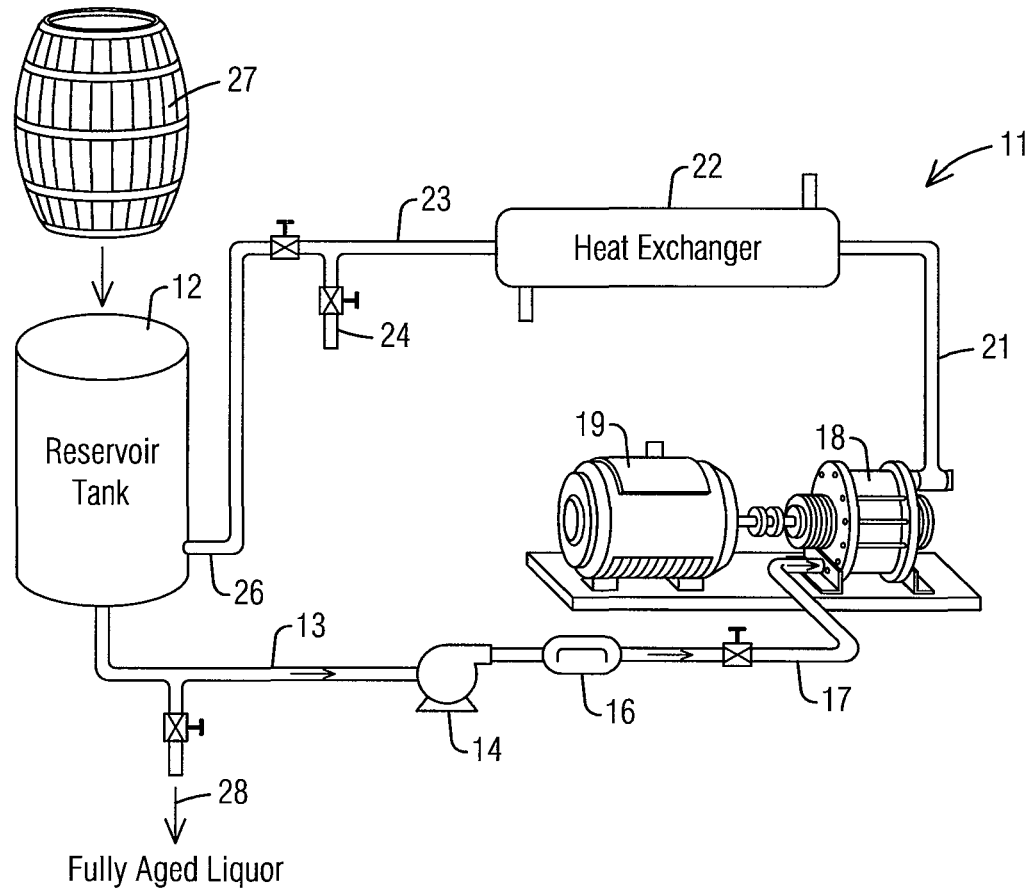
FIG. 2 is a schematic view showing another embodiment of the invention used here in conjunction with traditional pre-aging.
Figure 3:
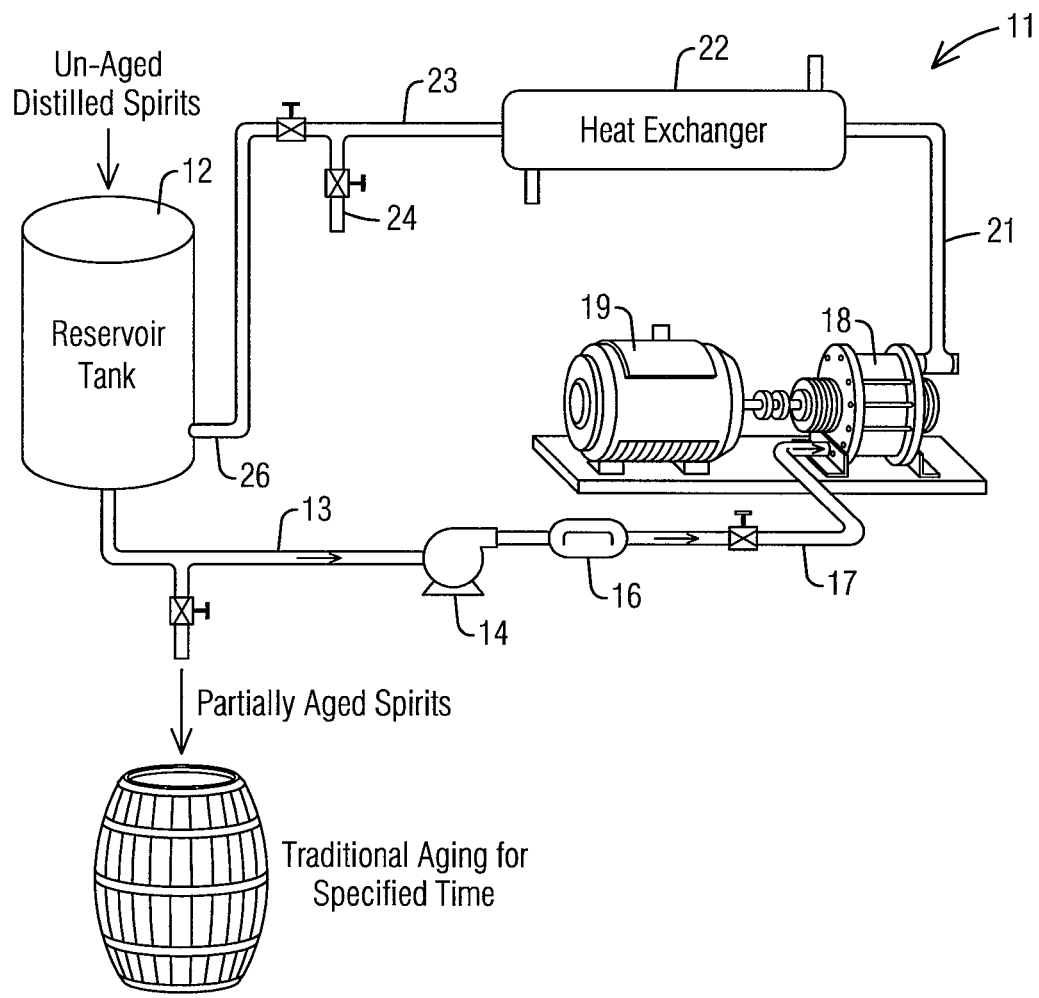
FIG. 3 is a schematic view showing yet another embodiment of the invention used here in conjunction with traditional post-aging.

FIGS. 2 and 3 illustrate hybrid systems for aging distilled spirits that include artificial aging with high energy cavitation in conjunction with traditional aging. Of course, such a hybrid system can be used in the aging of beer and wine in the same way. In FIG. 2, distilled spirits are partially aged in a traditional manner such as being left in a charred oak barrel 27 for a specified period of time. This time preferably is far less than the years required for full barrel aging and results in partial aging, partial filtration, and partial infusion of the desired flavors of the charred oak into the distilled spirits. The partially aged spirits can then be subjected to the cavitation induced aging in the apparatus described above for one or more cycles. Charred wood chips and/or other flavorings can be introduced if desired to obtain additional flavoring, coloring, and filtration during the process. The result is a fully aged liquor having characteristics unique to the charred oak barrel in which it was partially aged, but also having the full robust aging that traditionally only results from years of residence in oak barrels. Again, the total time to obtain the fully aged liquor product is a fraction of the time required to obtain the same benefits with traditional aging.

FIG. 3 illustrates an alternate hybrid process for obtaining similar results. Here, freshly distilled spirits are delivered from the distiller directly to a controlled cavitation device 11 according to the invention. As described above, the spirits are circulated through the controlled cavitation reactor or cavitator for a predetermined number of cycles, with or without the addition of charred wood chips and other flavoring and filtering media. After treatment for minutes or hours in the cavitation reactor, the distilled spirits are partially aged as if they had resided in traditional charred oak barrels for months or even years. The partially aged spirits may then be delivered to traditional charred oak barrels or other aging vessels for further aging in a more traditional manner. This may be desired, for instance, to infuse the resulting liquor with unique flavors from the barrel or for other reasons. After traditional aging in the barrel for a time far less than the several years usually required, the liquor is fully aged and virtually indistinguishable from its more venerable predecessors. Again, the total time to obtain the desirable flavor and character of liquor aged for years is reduced to a fraction of that time using a combination of the methodology of the present invention and traditional aging techniques.

The invention has been described herein in terms and within the context of exemplary embodiments and methodologies considered by the inventors to represent the best modes of carrying out the invention. However, the illustrated embodiments are not intended to and should not be construed to limit the scope of the invention. For example, while aging distilled spirits has been used in some instances as an example of the use of this invention, the invention itself is much broader than this. For instance, the methodology of the invention has been found useful in beer manufacturing, where pumping beer through a controlled cavitation reactor with hops and other flavorings can simulate the aging process in a fraction of the time. Wine can also be aged using the methodology of this invention. When aging wine, the wine may be pumped through a controlled cavitation reactor with wood chips and/or other flavorings. Exposure to shock waves in the cavitation zone accelerates many of the chemical reactions that naturally occur slowly with traditional beer and wine aging. Thus, the term "spirits" as used herein is meant to be construed to encompass beer and wine as well as distilled spirits. Any desired flavoring can be included in a stream of spirits, beer, or wine being aged including those mentioned and, for instance, coffee and chocolate (sometimes used to flavor beer) an any other flavoring desired. It will be appreciated by the skilled artisan, therefore, that a wide gamut of additions, deletions, and modifications, both subtle and gross, may be made to the example embodiments without departing from the spirit and scope of the invention exemplified by such embodiments.

What is claimed is:

1. A method of extracting flavoring from hops and infusing the extracted flavoring from the hops into beer, the method comprising the steps of:
   (a) obtaining a volume of beer to be subjected to infusion of hops flavoring;
   (b) obtaining a controlled cavitation reactor comprising a cylindrical housing having an internally mounted cylindrical rotor having an outer peripheral surface characterized by a plurality of cavitation inducing bores extending therethrough, wherein a cavitation zone is defined between the outer peripheral surface of the rotor and the inner peripheral surface of the housing;
   (c) adding the hops to the beer and moving the beer and hops through the cavitation zone of the controlled cavitation reactor while rotating the rotor within the housing at a rate sufficient to induce cavitation events in the beer as the beer moves through the cavitation zone; and
   (d) entraining hops in the beer in such a way that the hops move through the cavitation zone while entrained within the beer and are subjected to the cavitation events with the beer, wherein the cavitation events generate shock wave induced pressure variations in the beer within the cavitation zone, causing the beer to penetrate the hops entrained in the beer so as to filter contaminants from the beer, and extract the flavoring from the hops and infuse the flavoring extracted from the hops into the beer;
   wherein the rate at which the rotor is rotating is varied to control an intensity of the shock wave induced pressure variations generated by the cavitation events, and to control a shear rate of the hops due to cavitation events within the cavitation zone.

2. The method of claim 1 further comprising repeating steps (c) and (d) to liberate and infuse additional hops flavoring into the beer.

3. The method of claim 1 further comprising the step of at least partially aging the beer in a vessel following step (c).

4. The method of claim 1 further comprising the steps of moving the beer through a loop from the controlled cavitation reactor through a tank, and as the beer is moved through the loop, cooling the beer in a heat exchanger.

5. A method of infusing a liquid with flavoring from hops during production of beer, the method comprising the steps of:
   (a) collecting the liquid in a reservoir tank;
   (b) obtaining a controlled cavitation reactor comprising a cylindrical housing having an internally mounted cylindrical rotor with an outer peripheral surface characterized by a plurality of cavitation inducing bores extending therethrough, wherein a cavitation zone is defined between the outer peripheral surface of the rotor and the inner peripheral surface of the housing;
   (c) pumping the liquid from the reservoir tank through the cavitation zone of the controlled cavitation reactor while rotating the rotor within the housing at a rate sufficient to cause cavitation within the liquid so as generate shock wave induced pressure variations in the liquid as the liquid moves through the cavitation zone;
   (d) adding hops to the liquid before the liquid moves through the cavitation zone so that the hops are entrained within the liquid so as to move through the cavitation zone with the liquid, wherein the liquid with the hops entrained therein is and subjected to the shock wave induced pressure variations due to cavitation within while the liquid with the hops contained therein are within the cavitation zone, causing the liquid to penetrate the hops, liberate hops flavoring therefrom, and infuse the liberated hops flavoring into the liquid while filtering the liquid;
   (e) moving the liquid back to the reservoir tank; and
   (f) optionally repeating steps (c) through (d) to expose the liquid and hops to cavitation within the cavitation zone a predetermined number of times to liberate and infuse additional hops flavoring into the liquid; and
   (g) separating the hops and collecting the liquid.

6. The method of claim 5 wherein the liquid comprises beer.

7. The method of claim 5, wherein step (f) comprises moving the beer through a loop though the controlled cavitation reactor and the reservoir tank, and as the beer is moved through the loop, cooling the beer in a heat exchanger.

8. The method of claim 5, further comprising adjusting the rate at which the rotor is rotating to control an intensity of the shock wave induced pressure variations generated by the cavitation events.

9. The method of claim 5, further comprising adjusting the rate at which the rotor is rotating and adjusting a clearance between the outer peripheral surface of the rotor and the inner peripheral surface of the housing so as to control a shear rate of the hops due to cavitation within the cavitation zone.

* * * * *